Oct. 9, 1923.
E. A. LANGE
1,470,536
CONTAINER HANDLE
Filed May 12, 1922
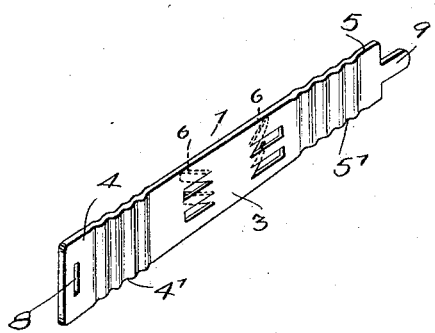
Fig.1.
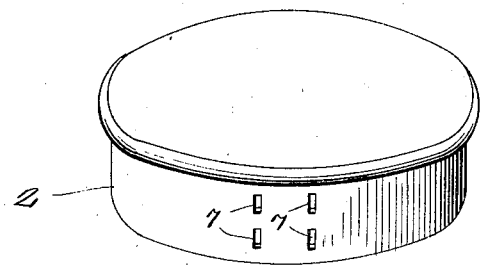
Fig.2.
Fig.3.
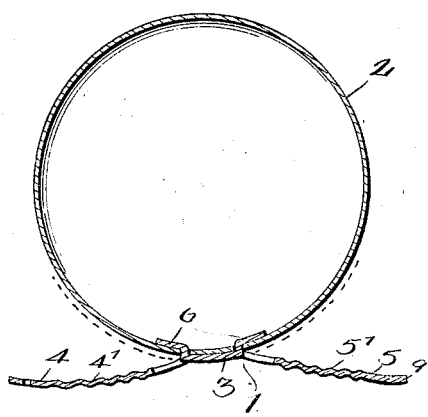
Fig.4.
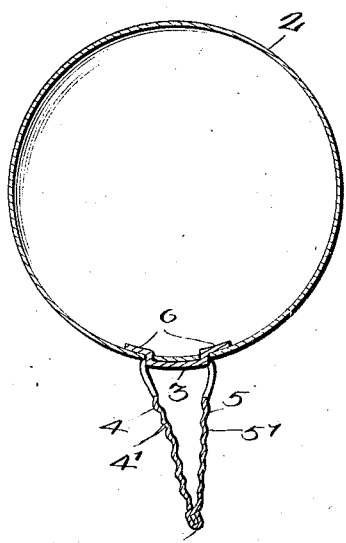
WITNESSES
George G. Myer
INVENTOR
E. A. LANGE,
BY
ATTORNEYS Patented Oct. 9, 1923.

1,470,536

UNITED STATES PATENT OFFICE.

ERNEST AUGUST LANGE, OF CLARESHOLM, ALBERTA, CANADA.

CONTAINER HANDLE.

Application filed May 12, 1922. Serial No. 560,323.

*To all whom it may concern:*

Be it known that I, ERNEST AUGUST LANGE, a subject of King of Great Britain, and a resident of Claresholm, Alta., Canada, have invented certain new and useful Improvements in Container Handles, of which the following is a specification.

My invention relates to container handles, and it consists in the combinations, constructions and arrangements herein described and claimed.

An object of my invention is to provide a simple and inexpensive handle which is adapted to be applied to a container such as a box for holding shoe polish, salve, or the like, and which can be arranged to lie close to the body of the container and out of the way when it is desired to pack the container into a relatively small space for shipment, or for any other purpose.

A further object of my invention is to provide a handle of the character described which can be instantly adjusted from out of the way or inactive position to active position so that the container to which applied can be conveniently moved from place to place or manipulated without being touched by the fingers or held in the hand.

A still further object of my invention is to provide a handle of the character described which can be made of a single strip of material and which is thoroughly practical commercially.

Other objects and advantages will appear in the following specification, reference being had to the accompanying drawings, in which:—

Fig. 1 is a perspective view showing in more or less developed position a handle embodying the invention, Fig. 2 is a perspective view of a container to which the handle exhibited in Fig. 1 is adapted to be applied, Fig. 3 is a horizontal section through the container, showing the handle applied thereto and in inactive position, and Fig. 4 is a view similar to Fig. 3, showing the handle in active position.

The embodiment of the invention illustrated in the accompanying drawings comprises a longitudinal substantially flat strip or body 1 which is made of any suitable material, such as tin, which can be bent to conform to the curvature of the outer wall of a body of a container, such as indicated at 2 in Fig. 2, as will herein appear.

The body or strip 1 is made in a single piece, being stamped or otherwise formed, and includes an intermediate fastening portion 3 merged at its ends into end portions 4 and 5, respectively, which end portions are substantially equal in length and are roughened on their surfaces for part of their length, as by being corrugated, as indicated at 4', and 5', respectively.

The intermediate fastening portion 3 of the body has struck therefrom to extend laterally thereof, a plurality of attaching lugs 6, these lugs preferably being arranged in spaced apart pairs of vertically alined lugs, the end pairs of lugs being equi-distant from the corresponding ends of the body. The embodiment of the invention illustrated in the accompanying drawings is provided with two pairs of the lugs 6, although obviously I may provide a greater or less number of these pairs of lugs without departing from the spirit and scope of the invention.

In order to attach the body 1 to a container, such as indicated at 2, it is only necessary to provide openings 7 through the walls of the body of the container in position to cooperate with the lugs 6 so that the respective lugs can be projected through the corresponding openings 7 and the ends of the lugs then clinched against the inner wall of the container. As illustrated to advantage in Fig. 3, the end portions 4 and 5 of the body can be swung from the position indicated by the full lines in Fig. 3 or from any other possible position after the intermediate portion has been attached to the body of the container in the manner described to the position indicated by the dotted line in Fig. 3, in which latter position the entire body is disposed flatwise against the body of the container and out of the way so that the container can be packed for shipment or placed in any space adapted to receive the container were the handle not applied thereto. As stated, the body or strip 1 is made of a material which will remain in any position to which bent and therefore the end portions 4 and 5 will remain close to the body of the container until moved therefrom to position the device in active position, as will now be described.

The end portion 4 has a slot or aperture 8 formed therethrough adjacent to its extremity and the end portion 5 has a lug extension 9 at its extremity adapted to be projected through the opening 8 when the end portions 4 and 5 have been moved outwardly into contact with each other at their ends, as illustrated in Fig. 4. The fastening lug or top 9 is bent over after being projected through the slot 8 to releasably hold the end portions 4 and 5 together. The end portions 4 and 5 now provide grip members which can be conveniently grasped to effect movement or manipulation of the container 2, as desired.

It is intended that a handle embodying the invention shall be provided for each container for which it is adapted and that the handle will remain applied to the container until the latter has served its purpose and has been discarded, although obviously the handle can be detached from the container when desired and used repeatedly. However, the cost of the handle will be very small and the loss occasioned by the discarding of the handle with the container to which applied, will be practically negligible. Therefore, if desired, the intermediate portion 3 of the handle may be permanently secured to the container by welding or in any other suitable known manner without departing from the spirit and scope of the invention.

Obviously, my invention is susceptible of embodiment in forms other than that herein described and claimed, and I therefore consider as my own all such modifications and adaptations of the invention as fairly fall within the scope of the appended claims.

I claim:—

1. As an article of manufacture, a handle for containers, comprising a longitudinal body made in a single piece and having attaching elements intermediately of the ends for engaging openings in a container, and cooperating fastening portions at the opposite ends of the body for detachably securing the ends of the body one to the other.

2. As an article of manufacture, a handle comprising an elongated body made in a single piece, said body having a plurality of spaced apart attaching lugs struck therefrom at points approximately midway between its ends, said lugs being adapted to engage openings in a wall of a container.

3. As an article of manufacture, a longitudinal substantially flat body made of a relatively soft metal and having laterally extending attaching lugs struck therefrom intermediately of its ends, said lugs being adapted to engage openings in a wall of a container, said body being provided with an opening therethrough adjacent to one extremity thereof and with a fastening lug at its other extremity adapted to be projected through the said opening when the ends of the body have been moved together.

4. As an article of manufacture, a handle consisting of a strip made of a suitable material to render the strip capable of being bent and adapted to remain in any position to which bent, whereby said strip is adapted to remain bent in close conformity to the walls of a container, said strip having laterally extending attaching lugs struck therefrom intermediately of its ends for attachment to the container and having cooperating means at its ends for securing the ends of the strip one to the other.

5. As an article of manufacture, a handle consisting of a strip made of a suitable material to render the strip capable of being bent and adapted to remain in any position to which bent, said strip having laterally extending attaching lugs struck therefrom intermediately of its ends and having cooperating means at its ends for securing the ends of the strip one to the other, said strip being formed to provide roughened portions adjacent to its extremity.

6. As an article of manufacture, a handle for containers comprising a single strip of a material suitable to be bent and to remain in any positon to which it is bent, whereby said strip is adapted to remain bent in close conformity to the walls of a container, said strip having an attaching portion struck outwardly therefrom at a point appproximately midway of its length for attachment to the container.

7. As an article of manufacture, a handle consisting of an elongated strip of suitable material to render the strip capable of being bent and adapted to remain in any position to which it is bent, whereby the strip is adapted to lie in close conformity to a container to which it is attached, and means for permanently attaching said strip to the container intermediate the ends of said strip, said strip at its ends having a cooperating means for securing the ends one to the other for the purpose specified.

8. As an article of manufacture, a handle comprising an elongated strip of a material suitable to render the strip bendable at any point along its length and thus adapted to be bent to lie in close conformity to a container, said strip being adapted for attachment intermediate its ends to the container.

9. As an article of manufacture, a handle comprising an elongated strip made of a material suitable to render the strip readily bendable at any point along its length and adapted to remain in any position to which it is bent, whereby the strip is adapted to lie in close conformity to a container to which it is attached, said strips having at its ends cooperative means for securing the ends one to the other, the strip being capable of being attached intermediate its ends to the container.

ERNEST AUGUST LANGE.